Oct. 25, 1932.                T. J. SMULSKI                1,885,050
                            INDICATING APPARATUS
                    Filed Dec. 20, 1926        2 Sheets-Sheet 1
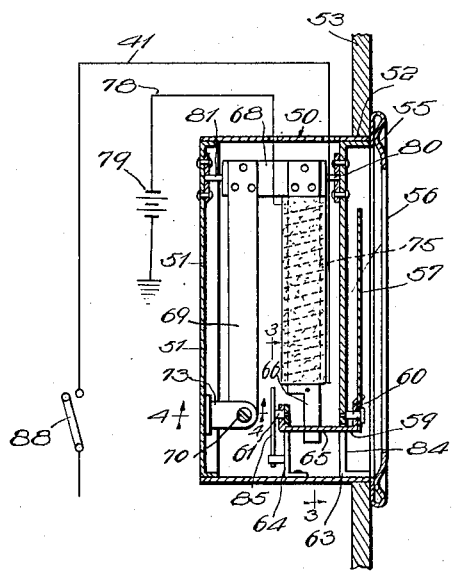
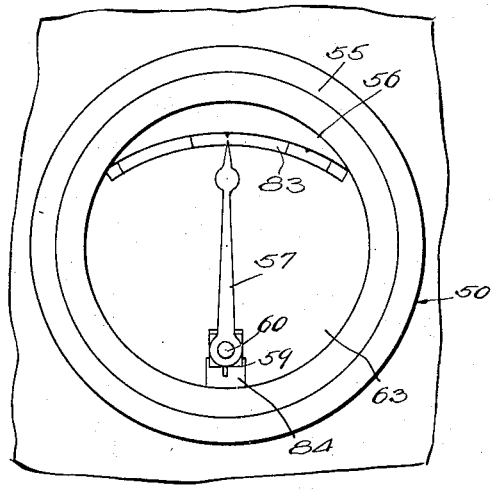
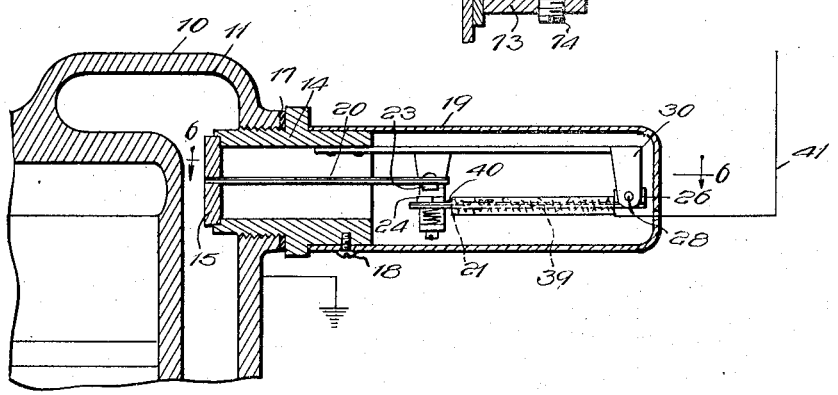
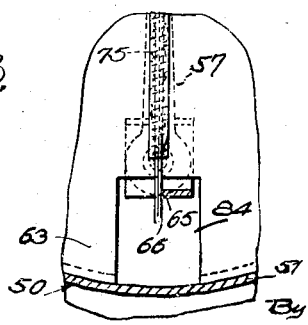
Inventor
Theodore J. Smulski
Witness:
William P. Kilroy
Hill & Hill
Attys.

Oct. 25, 1932.  T. J. SMULSKI  1,885,050

INDICATING APPARATUS

Filed Dec. 20, 1926  2 Sheets-Sheet 2

Patented Oct. 25, 1932

1,885,050

UNITED STATES PATENT OFFICE

THEODORE J. SMULSKI, OF LAKE ZURICH, ILLINOIS, ASSIGNOR TO THE ANDERSON CO., OF GARY, INDIANA, A CORPORATION OF INDIANA

INDICATING APPARATUS

Application filed December 20, 1926. Serial No. 156,054.

My invention relates broadly to indicating apparatus and particularly to apparatus adapted to accurately indicate an existing condition when the same condition or other conditions tend to render the apparatus inaccurate.

A particular object of the invention is to provide improved apparatus of the kind described which will give a precise physical indication of an existing condition when that condition or any other conditions such as encroaching temperatures tend to affect the apparatus and render it inaccurate.

One form of the invention is embedded in the apparatus particularly adapted to indicate the temperature of the fluid in the cooling system of an internal combustion engine, the apparatus being provided with means which will compensate for encroaching temperatures, atmospheric or otherwise.

Another form of the invention is embodied in apparatus which is particularly adapted to indicate the temperature obtaining at any predetermined point or place, the apparatus preferably comprising one instrument adapted to be positioned at one place and an indicating instrument adapted to be positioned at another p'ace. Thus, the first instrument may be placed outdoors and the indicating instrument may be placed indoors, the construction being such that the instrument placed indoors will accurately indicate the temperature outdoors. The construction is such that neither instrument will be rendered inaccurate by variations in temperature indoors or outdoors.

Many other objects and advantages of the construction herein shown and described will be obvious to those skilled in the art from the disclosure herein given.

To this end my invention consists in the novel construction, arrangement and combination of parts herein shown and described, and more particularly pointed out in the claim.

In the drawings, wherein like reference characters indicate like or corresponding parts:

Fig. 1 is a central section taken through an indicating instrument embodying one form of the invention;

Fig. 2 is a front elevation of the construction shown in Fig. 1;

Fig. 3 is a section taken on line 3—3 of Fig. 1;

Fig. 4 is a section taken on line 4—4 of Fig. 1;

Fig. 5 is a section taken through apparatus embodying the invention and adapted to be used in connection with the instrument shown in Fig. 1;

Fig. 6 is a section taken on line 6—6 of Fig. 5;

Fig. 7 is a section taken on line 7—7 of Fig. 6;

Fig. 8 is a section taken on line 8—8 of Fig. 6;

Fig. 9 is an elevation of apparatus embodying another form of the invention and adapted to be used in connection with the indicating instrument shown in Fig. 1;

Fig. 10 is a section taken on line 10—10 of Fig. 9;

Fig. 11 is a section taken on line 11—11 of Fig. 10; and

Fig. 12 is a section corresponding to the section shown in Fig. 6 but showing apparatus embodying another form of the invention.

In the drawings, I have illustrated two forms of the invention embodied in apparatus of the type shown and described in my copending applications, Serial Nos. 133,426 and 147,076 filed September 3, 1926, and November 8, 1926, respectively, but as hereinafter set forth, my invention is not limited to the particular construction shown in the copending applications, nor to the particular uses mentioned therein.

Referring for the present to Figs. 5, 6, 7, and 8 of the drawings wherein I have disclosed one embodiment of the invention, the reference character 10 designates an internal combustion engine of the type which is commonly employed in automobiles and the like, and which, for the purposes of this disclosure, is assumed to be a part of an automobile. The engine 10 is provided with a water jacket 11 through which a cooling fluid is circulated by any suitable means (not shown). Associated with the water jacket 11 is apparatus which embodies the invention and is adapted to indicate the temperature of the cooling fluid so that the temperature thereof may be noted at any time by the operator of the engine or automobile. In this instance, the improved indicating apparatus preferably comprises a hollow fitting 14, screw threaded into the outer wall of the water jacket 11 and preferably closed at its inner end by a disc 15. The fitting 14 and disc 15 are preferably formed of metal so that electrical current may flow from the disc through the fitting 14 and thence through the engine 10 and the chassis of the automobile (not shown) to the storage battery, or to any other source of electrical energy provided in the automobile. This is in accordance with the usual practice wherein the chassis of an automobile serves as a ground. The fitting 14 may be of any suitable shape and a gasket 17 may be inserted between it and the outer wall of the water jacket 11 to prevent leakage of the cooling fluid from the water jacket.

Secured to the outer end of the fitting 14 by screws 18, or the equivalent, is a housing member 19 which encloses a plurality of thermostats 20, 21 and 22. The thermostat 20 is rigidly secured in the disc 15 so that the thermostat is subjected to the heat of the fluid in the water jacket 11, the disc 15 being so positioned that it comes in direct contact with the fluid. At its free end, the thermostat 20 carries a contact point 23 engageable with a contact point 24 secured to one end of the thermostat 21 which has its other end rigidly secured to a support or block 26 preferably formed from material which serves both as electrical and heat insulation. Two pins 28 projecting from the block 26 pivot the block in a bracket member 30 which is rigidly secured to the fitting 14. As best shown in Figs. 5 and 6, the thermostat 22 also has one of its ends rigidly secured to the block 26, the free end of the thermostat 22 being urged against a set screw 33 by a compression spring 34 (see Fig. 8). The set screw 33 is preferably mounted in a U-shaped bracket 35 which is rigidly secured to an arm 36 preferably formed integral with the bracket 30. A second set screw 37 is employed to align the compression spring 34 with respect to the free end of the thermostat 22. Obviously, the position of the free ends of the thermostats 21 and 22 can be angularly adjusted as a unit around the pivotal axis of the block by manipulating the screw 33.

Wound around the thermostat 21 and insulated therefrom throughout the greater portion of its length is a resistance wire 39 which has one of its ends soldered to the thermostat as indicated at 40, the other end of the resistance wire 39 being connected to one end of an electrical conductor 41.

The thermostats 20, 21 and 22 may be of any suitable construction but are preferably of the bi-metallic type. The thermostat 20 is so constructed that when it is subjected to heat, it will flex or bend toward the free end of the thermostat 21 so that if it is subjected to sufficient heat, it may bring its contact point 23 into engagement with the contact point 24. The thermostats 21 and 22 are preferably substantially identical in construction or are so constructed that when they are subjected to equal temperatures, they will both bend or flex an equal amount and in the same direction, the thermostat 21 being adapted to bend or flex away from the free end of the thermostat 20 when it is subjected to heat. It will be readily understood that when the two thermostats 21 and 22 are equally subjected to a rise in temperature, the tendency of the free end of the thermostat 21 is to move away from the free end of the thermostat 20, but this tendency is corrected or negatived by the action of the thermostat 22 which flexes or bends substantially to the same extent as the thermostat 21 and causes the block 26 to be angularly displaced around its pivotal axis in such manner that it tends to prevent displacement of the free end of the thermostat 21. The apparatus is constructed and adjusted so that the contact point 24 is spaced a predetermined distance away from the contact point 23 when the thermostats 20, 21 and 22 are all of a predetermined temperature. Keeping in mind the function of the thermostat 22, it is readily understood that when the thermostats are all subjected to a like higher temperature, the thermostat 22 prevents displacement of the contact point 24 as far as the action of the thermostat 21 is concerned, but it is also readily understood that the thermostat 22 does not directly prevent displacement of the contact point 23, and that the thermostat 20 may flex or bend in such manner that the contact point 23 will be urged against the contact point 24 to displace it against the action of the thermostats 21 and 22. As set forth above, the thermostat 20 is so constructed that when it is subjected to a rise in temperature, it flexes or bends toward the thermostat 21 and therefore, when it is sufficiently heated by the cooling fluid in the water jacket 11, it will urge its contact point 23 against the contact 24. Assuming that the contact point 23 engages the contact point 24 and that the thermostat 21 is subjected to the heat caused by the flow of an electrical current through the resistance wire 39, it is readily apparent that the thermostat 21 will flex or bend to disengage the contact 24 from the contact 23, and such movement of the thermostat 21 will not be compensated by the thermostat 22 as it will not be subjected to the heat of the resistance wire 39. The purpose of this construction will appear hereinafter.

Referring now to Figs. 1, 2, 3, and 4, wherein I have illustrated an indicating instrument embodying the invention, the reference character 50 designates the instrument in general, the improved instrument preferably comprising a housing 51 adapted to be mounted in an aperture 52 provided in the instrument board 53, or the equivalent, of the automobile of which the internal combustion engine 10 forms a part. The housing 10 is preferably provided with a front cover plate 55 having a sight opening 56 through which a needle or pointer 57 may be viewed by the operator of the automobile, the pointer 57 being preferably rigidly secured to a U-shaped bracket 59 which is preferably pivoted by pins 60 and 61 to a dial plate 63 and a bracket member 64, respectively.

Engaging one side of the U-shaped bracket 59 is one end of a thermostat 66 which has its other end secured to a block 68 preferably formed of material which serves as heat and electrical insulation. Also secured to the block 68 is one end of a thermostat 69 which has its other end held in engagement with a set screw 70 by a compression spring 71. The set screw 70 is mounted in a U-shaped bracket 73 which is rigidly secured to the housing member 51. A second set screw 74 screw threaded into the U-shaped bracket 73 aligns the spring 71 with respect to the free end of the thermostat 69. Wound around the thermostat 66 and insulated therefrom is a winding or resistance wire 75 which has one of its ends connected by a conductor 78 to one terminal of a storage battery 79, or the equivalent, which has its other terminal grounded. The other end of the winding or resistance wire 75 is connected to the aforementioned conductor 41 so that when the contact point 23 engages the contact point 24, an electrical current will flow as follows: From the battery 79, through the conductor 78, the winding or resistance wire 75, the conductor 41, the resistance wire 39, the thermostat 40, the contact point 24, the contact point 23, the thermostat 20, and thence through the engine 10, back through ground to the battery 79.

Pins 80 and 81 projecting from the block 68 pivotally mount the block within the housing member 51, the arrangement being similar to the arrangement of the block 26 in Fig. 5. The thermostats 66 and 69 are preferably so designed that when they are both subjected to the same degree of heat, they both tend to flex or bend substantially equal amounts in a like predetermined direction. In this instance, when the thermostats are subjected to heat, they flex in such manner that the thermostat 66 tends to angularly displace the pointer 57 in a clockwise direction (Fig. 2) but the thermostat 69 compensates for this action of the thermostat 66 as it acts against the set screw 70 and angularly displaces the block 68 to prevent displacement of the free end of the thermostat 66. Obviously, the set screw 70 may be manipulated to adjust the thermostats 66 and 60 as a unit to bring the pointer 57 into an adjusted position with respect to a scale 83 provided upon a dial plate 84 disposed within the housing member 51. I prefer to provide a hair spring 85 which holds the U-shaped bracket 59 against the free end of the thermostat 66.

From the foregoing description of the thermostats 66 and 69, it is apparent that they cooperate in substantially the same manner as the thermostats 21 and 22 described above, and that there is no displacement of the free end of the thermostat 66 when the thermostat 69 is subjected to the same temperature. However, if the resistance wire 75 heats the thermostat 66 to a higher temperature than that of the thermostat 69, the free end of the thermostat 66 will be displaced to in turn displace the pointer 57 in a clockwise direction (Fig. 2).

The operation of the above apparatus is substantially as follows: Assuming that the set screw 70 and 33 have been manipulated in such manner that the pointer 57 indicates the correct temperature to which both instruments are subjected at the same time, and so that the contact points 23 and 24 are spaced apart a predetermined distance at a predetermined temperature, it will be understood that when the engine 10 is set into operation and the temperature of the cooling fluid increases, the thermostat 20 will flex or bend in such manner that the contact point 23 will engage the contact point 24 and permit an electrical current to flow as follows: From the battery 79, through the conductor 78, the resistance wire 75, the conductor 41, the resistance wire 39, the thermostat 21, the contact points 24 and 23, the thermostat 20 and thence through the engine to ground and back to the battery 79. When the thermostats 21 and 66 are thus subjected to heat from the resistance wires 39 and 75 respectively, they flex or bend in such manner that the contact point 24 is disengaged from the contact point 23 and the pointer 57 is angularly displaced in a clockwise direction around the pivotal axis of the pins 60 and 61. As soon as the contact point 24 is disengaged from the contact point 23, the circuit through the battery 79 is opened and the thermostats 21 and 66 begin to cool to the temperature of the surrounding atmosphere and the pointer 57 tends to move back in a counter clockwise direction (Fig. 2). However, such movement of the pointer 57 is accompanied by movement of the contact point 24 into engagement with the contact point 23 and the circuit is again closed through the battery 79. This slight movement of the pointer 57 will, of course, indicate that the apparatus is in operation, but the apparatus may be constructed in such manner that the movement will not be perceptible. This sequence of operations is continued indefinitely and the position which the pointer 57 assumes is a position indicating the temperature of the cooling fluid upon the scale 83, it being readily understood that the amount of heat to which the thermostats 21 and 66 are subjected depends upon the position into which the contact point 23 is brought through the responsive action of the thermostat 20 to the temperature of the cooling fluid. Thus, if the thermostat 20 is flexed a relatively large amount by the heat from the resistance wires 39 and 75 respectively, the pointer 57 will be angularly displaced a proportioned distance, but if the thermostat 20 is not flexed to any great degree, the thermostats 21 and 66 will be subjected to a relatively small amount of heat by the resistance wires 39 and 75 and the pointer 57 will only be angularly displaced through a relatively small distance.

The above cycle of operations is substantially identical with that disclosed in my copending application, Serial No. 133,426 filed September 3, 1926, but in this instance, the apparatus is not rendered inaccurate by a variation or change in atmospheric or any other encroaching temperature for if the thermostats 21 and 22 or the thermostats 66 and 69 are subjected to changes or variations in atmospheric temperature or any other encroaching temperature, the thermostats 22 and 69 will angularly displace the blocks 26 and 58, respectively, to compensate for such changes or variations in temperature.

In most instances, I prefer to provide a switch 88, or the equivalent, in the conductor 41 so that the apparatus may be rendered functionally inoperative when the automobile is not in use. This prevents waste of the electrical energy of the battery 79.

As in the copending applications mentioned above, apparatus embodying the invention is advantageous as the accuracy of the apparatus is not dependent upon the maintenance of a constant voltage in the electrical circuit. When the voltage varies, the contact points 23 and 24 engage and disengage from each other in such manner that they compensate for the change in voltage. This is, of course, due to the fact that the engagement of the contacts is controlled by the heat imparted to the thermostat 21 by the winding 39 and that it is controlled by the position of the contact 23.

Referring now to Figs. 9, 10 and 11 wherein I have shown an instrument embodying another form of the invention, the reference character 100 designates the instrument generally, which preferably comprises a plate 101 formed of electrical insulation and adapted to be secured to a wall 103 or any other suitable support. Mounted upon the plate 101 is a U-shaped bracket 105 to which one end of an arcuate thermostat 106 is rigidly secured. Secured to the free end of the thermostat 106 is a bar 107 having a contact point 108 in the form of a set screw screw-threaded into its free end. The contact point 108 is engageable with a contact point 109 mounted on the free end of a thermostat 110 which has its other end rigidly secured to a block 112 formed of material which serves both as electrical and heat insulation, the block 112 being pivoted by pins 113 in the bracket 105. Also secured to the block 112 is a thermostat 114, the free end of which is urged against a set screw 115 by a compression spring 116 centered by a set screw 117 mounted in a U-shaped bracket 118, the set screw 115 being also mounted in the bracket 118. The bracket 118 is secured to the plate 101 and the construction resembles that described in the other form of the invention in that the thermostats 114 and 110 are so constructed that the thermostat 114 compensates for deflection of the thermostat 110 by reason of a change in temperature to which both thermostats are subjected equally. Thus, when there is a rise in atmospheric temperature, the thermostat 110 flexes or bends in such manner that it tends to move the contact 109 away from the contact 108, but the thermostat 114 acting in the same direction as the thermostat 110 angularly displaces the block 112 in such manner that the contact 109 is not displaced by the deflection of the thermostat 110.

Wound around the thermostat 110 and insulated therefrom is a resistance wire 116 which has one of its terminals connected to a binding post 117 and has its other terminal connected to a binding post 118, the binding posts being mounted upon the plate 101. It will be noted that the thermostat 106 is spaced sufficiently far away from the wire 116 to prevent it from being heated thereby. Connected to the binding posts 117 and 118 are electrical conductors 120 and 121, respectively, which may be connected to the resistance wire 75 of the indicating instrument shown in Figs. 1 to 4, inclusive. The connections are preferably made as follows: The conductor 120 is connected to the conductor 41 and the conductor 121 is connected to that terminal of the battery 79 which is grounded in Fig. 1. The instrument 100 may then be placed outdoors and the instrument 50 together with the battery 79 may be placed indoors. However, I preferably subject both instruments to a relatively low temperature at first and adjust the set screws 115 and 70 so that there is a slight clearance between the contacts 108 and 109 and so that the pointer 57 indicates the correct atmospheric temperature upon the scale 83 which, of course, has been previously calibrated. When the instrument 100 is then subjected to a different temperature which is assumed to be higher than the temperature at which the instruments were calibrated, the thermostat 106 bends in such manner that the contact point 108 engages the contact point 109 and an electrical current flows as follows: From the battery 79, through the conductor 78, the resistance wire 75, the conductor 41, the conductor 120, the resistance wire 116, and through the conductor 121 back to the battery 79. The heat from the resistance wires 116 and 75 causes the thermostats 110 and 66, respectively, to bend in such manner that the contact 109 is disengaged from the contact 108 and the pointer 57 is displaced in a clockwise direction (Fig. 2). Of course, the circuit through the battery 79 is opened when the contact 109 is disengaged from the contact 108 and the thermostats attempt to straighten, whereupon the contact 109 again engages the contact 108 and closes the circuit. This sequence of operations is repeated until the switch 88 is opened but the construction is such that the pointer 57 will indicate upon the scale 83, the temperatures to which the instrument 100 is subjected even though the instrument 50 is subjected to a different temperature as the thermostat 69 compensates for the different temperature to which the instrument 50 is subjected. Of course, the thermostat 114 prevents the thermostat 110 from bringing the contact 109 out of its correct position with respect to the contact 108.

As in the invention disclosed in the aforementioned copending application, Serial No. 133,426 filed September 3, 1926, it is contemplated in this invention to utilize the movement of a primary electrical contact or its equivalent to control the intensity of an electrical, electro-magnetic, thermal, or other impulse, in a primary instrument, which in turn will control with corresponding intensity a secondary instrument located at a distance, which secondary instrument may be utilized either to indicate the degree of movement of said primary contact or its equivalent, or may be used to control the functioning of other instruments or apparatus, -it being understood that the position of the primary electrical contact or its equivalent, will be varied according to the variations of some factor to be indicated in the secondary instrument, or will be controlled arbitrarily to influence such other instrument or apparatus desired to be controlled by the secondary instrument.

While, in this application, I have preferred to disclose the present invention in connection with apparatus particularly adapted to indicate variations in temperature, it will be readily understood that the invention may be embodied in apparatus adapted to give indications of liquid levels, rates of speeds, weights, positions of members and wind velocities, or any other change in conditions which may be made to change the position of the contact point 108, or its equivalent. I do not wish to limit myself to the particular uses enumerated as the invention has a wide application. If the aforementioned application, Serial No. 133,426 filed Sept. 3, 1926, is examined, it will be noted that rates of speed may be indicated by apparatus embodying the invention set forth in that application. Obviously, my present invention can be embodied in the apparatus shown in the former application to compensate it for variations in atmospheric or other encroaching temperature. In a like manner, the apparatus shown in my copending application, Serial No. 147,076, filed Nov. 8, 1926, may also have the present invention embodied therein to correct it for variations in encroaching temperatures. It is obvious that if the position of the contact point 108 may be influenced with relation to liquid level, as may be done by utilizing the common form of float and lever, or by speed, as may be accomplished by using the common form of spring governor, or by temperature, as may be accomplished by utilizing a simple thermostatic blade, the functioning of the apparatus embodying the invention will be the same in each instance and calibration of the scale 83 may be varied to suit.

There are many other uses for the invention, in fact, it may be used to indicate accurately any changing condition which can be caused to vary the position of the contact point 108, or its equivalent.

The term "indicating" is used in an extremely broad sense in this application as by the word "indicating" I intend to include the apparatus which does not give a visible signal but rather controls other mechanism which in turn controls the conditions which are being interpreted.

In Fig. 12, I have shown a modification of the apparatus shown in Fig. 6, the several parts being identified by the same reference numerals as they are in Fig. 6 with the letter "a" added thereto. As is readily understood, the thermostat 22a functions in the same manner as the thermostat 22 to control the position of the free end of the thermostat 21a, but it will be noted that the thermostat 22a is provided with a covering 22b which has substantially the same heat insulating characteristics as the material provided for electrically insulating the greater portion of the resistance wire 39a from the thermostat 21a. This construction insures that the thermostats 21a and 22a will be equally affected by variations in temperatures to which both are subjected.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

A unitary electric control device comprising a plug casing adapted to be removably mounted upon the wall of a container of thermally variable liquid with a portion projecting therethrough and into thermal contact with the therein contained liquid, a thermostatic element supported internally of the casing upon the said projecting portion thereof, a second thermostatic element supported internally of the casing, an electric heater for the second element, a pair of controlling contacts disposed in the plug adapted to be operated by movement of the first mentioned thermostatic element upon thermal response thereof to liquid temperature, and to be mutually disabled by movement of the second thermostatic element upon thermal response thereof to heat from the winding, an electric circuit comprising the pair of contacts and said heating winding in serial relation, and adapted to be included in serial circuit with a source of current and an electrical indicator device.

In testimony whereof, I have hereunto signed my name.

THEODORE J. SMULSKI.